G. H. KAEMMERLING.
METHOD AND APPARATUS FOR BURNING FUEL.
APPLICATION FILED NOV. 25, 1916.

1,251,043.

Patented Dec. 25, 1917.
5 SHEETS—SHEET 1.

Fig 1.

INVENTOR
G. H. Kaemmerling,
BY
Pennie, Davis & Marvin
ATTORNEYS

G. H. KAEMMERLING.
METHOD AND APPARATUS FOR BURNING FUEL.
APPLICATION FILED NOV. 25, 1916.

1,251,043.

Patented Dec. 25, 1917.

INVENTOR
G. H. Kaemmerling,
BY
Pennie, Davis + Marvin
ATTORNEYS

G. H. KAEMMERLING.
METHOD AND APPARATUS FOR BURNING FUEL.
APPLICATION FILED NOV. 25, 1916.

1,251,043.

Patented Dec. 25, 1917.
5 SHEETS—SHEET 3.

INVENTOR
G. H. Kaemmerling,
BY
Pennie, Davis & Marvin
ATTORNEYS

UNITED STATES PATENT OFFICE.

GUSTAV H. KAEMMERLING, OF ALLENTOWN, PENNSYLVANIA, ASSIGNOR TO FULLER-KAEMMERLING ENGINE COMPANY, OF ALLENTOWN, PENNSYLVANIA, A CORPORATION OF DELAWARE.

METHOD AND APPARATUS FOR BURNING FUEL.

1,251,043.      Specification of Letters Patent.      Patented Dec. 25, 1917.

Application filed November 25, 1916. Serial No. 133,291.

*To all whom it may concern:*

Be it known that I, GUSTAV H. KAEMMERLING, a citizen of the United States, and a resident of Allentown, in the county of Lehigh and State of Pennsylvania, have invented certain new and useful Improvements in Methods and Apparatus for Burning Fuel; and I do hereby declare the following to be a full, clear, and exact description of the invention, such as will enable others skilled in the art to which it appertains to make and use the same.

Successful operation of internal combustion engines, as most commonly constructed, depends in large measure on practically tight joints; that is to say, practically no leakage past the piston and past the valves. From this necessity for tight joints arises many difficulties. Accurate workmanship is required in machining the cylinder and in preparing and adjusting the piston rings. Accurate fitting and frequent renewals or adjustments of valves and valve seats are ordinarily required, and it is because of this and the severe temperature conditions to which the valves are subjected and the resultant liability to warping and erosion, that puppet valves have been used so extensively in preference to rotary or sliding valves. Even with puppet valves, the warping due to the high temperatures to which they are exposed, and the cutting or erosion to which they are subjected by the passage of the gases at high velocity, has proven troublesome, particularly at high engine pressures.

These difficulties with internal combustion engines designed for the burning of liquid fuel, such as gasolene, kerosene and heavy hydrocarbon, are greatly magnified when the fuel is a solid fuel, such as pulverized coal, for in the latter case not only is there greater tendency for mechanical wear on the fuel intake due to the scouring action of the powdered solid, but there is an appreciable quantity of ash formed within the cylinder by the burning coal dust and also at times some molten or solid slag, and this residuum, if permitted to enter between accurately machined wearing surfaces, or over nicely adjusted valve faces, will quickly destroy their effectiveness with resultant decrease in engine efficiency. These mechanical difficulties have, in the past, practically prevented the use of powdered coal as a fuel for internal combustion engines.

The present invention relates to internal combustion engines which, while operative with improved results on liquid and gaseous fuels of the ordinary kinds, are suited to use with pulverized solid fuel such as powdered coal. The present invention also relates to improved methods of burning fuels whether liquid, gaseous, or a pulverized solid.

It is an object of the present invention to provide an engine relatively free from fine piston fits or fine valve fits or adjustments, and one in which metal piston rings need not be used and wherein the bearing or wearing surfaces of the valves and of the cylinder are not exposed to the gases during the high temperature part of the cycle.

It is also an object of the present invention to provide a method wherein the admission of the fuel charge into the cylinder, its retention therein under compression, and its ultimate delivery therefrom after ignition, are carried out in novel manner, particularly when the charge contains pulverized solid fuel, such as coal dust.

To attain the foregoing objects, that part of the piston which fits with nicety in the cylinder, is provided with an extension having a relatively loose fit, whereby there is formed an annular chamber, wherein a sealing liquid, such as water, is maintained, as by periodic injection from an external source. By suitably positioning the valves of the cylinder, they may be covered with this sealing liquid during the high temperature part of the cycle, and not only protected against the high temperatures, but also, in effect, sealed by the overlying body of liquid.

It is a further object of this invention to provide an engine wherein, if powdered solid fuel, such as powdered coal, is used, such coal ash as is deposited in the annular passage will be carried off by a removing body of liquid, and in such a way that it will not gain access to the relatively tight joint between the piston and its cylinder, and will pass around the liquid egress valve and over its seat at such a low temperature as not to stick to these surfaces or unduly cut or wear them.

In the preferred embodiment, the body of liquid used for sealing the piston and the valves is also used for flushing out the deposited ash from the burned fuel. The periodic renewal of this body of liquid keeps the cylinder and all of its adjuncts at a moderate temperature, low enough to prevent troublesome deposits of solid material and low enough to prevent troublesome warping, and by its passage around the piston extension and over the cylinder walls, keeps these surfaces scoured and clean and promptly carries off through the water egress such solid material as might otherwise progressively accumulate within the cylinder with resultant impairment of its operation.

It is a further object of the present invention to provide improved means for producing and delivering to the engine cylinder an appropriate mixture of pulverized solid fuel and air, and in addition, when desired, to provide means for preceding and likewise following the introduction of this mixture into the cylinder with charges of air alone, one of which by following into the cylinder in the wake of the fuel mixture cleans up any dust which might otherwise settle in the intake chamber, and on the intake valve seat, and the other of which, by preceding the next combustible charge, serves to separate it from such hot gases as may remain in the cylinder, thereby preventing premature ignition.

Other objects and advantages of the method and apparatus will be made clear by the following detailed description, which is to be taken in conjunction with the accompanying drawings, wherein—

Fig. 5 is a sectional elevation of a cylinder of a four-cycle engine;

Fig. 6 is a diagrammatic representation of the system for mixing air with pulverized solid fuel, such as coal dust, and delivering the mixture to the cylinder intake chamber in proper condition for delivering to the cylinder;

Fig. 7 is a sectional plan on the line 7—7 of Fig. 1, showing the tangential arrangement of the water inlets;

Fig. 8 represents, somewhat diagrammatically, the water pumping and storing mechanism, whereby at proper time intervals, fresh water is delivered to the cylinder to renew the piston seal and to wash out coal ash and the like;

Throughout the several figures and the various modifications there illustrated, like reference characters designate corresponding elements, even though in the several modifications these elements may be of differing shape or position.

Figure 1:
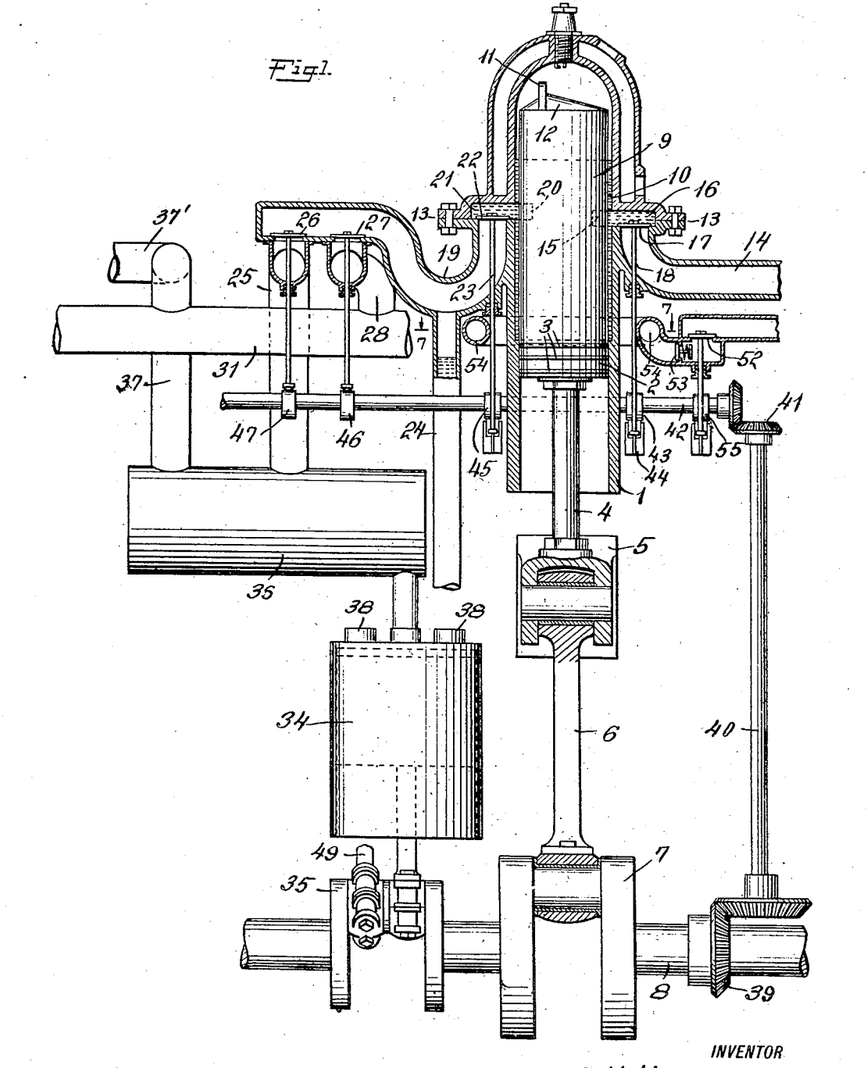
Figure 1 is a sectional elevation, somewhat diagrammatic in character, showing the cylinder and its associated parts.

For convenience in disclosure, those engine parts which are shown in Fig. 1 as associated with the cylinder and piston of the preferred embodiment, have been omitted from Figs. 2, 3, 4 and 5, but it is to be understood that the piston, valve stems, intake, exhaust and water supply chambers of these modifications are to be connected and are to operate substantially as described in connection with the corresponding elements of Fig. 1; with the exception of Fig. 5, which being a four-cycle engine, sucks in the fuel charge, which therefore need not be under pressure, and cleans itself of exhaust gases without the aid of scavenging air under pressure.

In the preferred embodiment illustrated in Fig. 1, the engine cylinder 1 is finished to give a sliding fit over a piston 2 which has packing rings 3 which may be of metal or piston packing, such as used in pumps. The piston rod 4 may be connected to a crosshead 5 guided in usual manner and connected through connecting rod 6 with a crank 7 on the main engine shaft 8.

Above the upper limit of travel of the piston rings 3, cylinder 1 is of larger internal diameter, as shown. Above packing rings 3, piston 2 is provided with a cylindrical extension 9 which, though it may be of the same diameter as the body of the piston, is nevertheless spaced sufficiently from the adjacent wall of the cylinder to form an annular chamber, wherein may be received a body of liquid 10, such as water, the functions and advantages of which are hereinafter set forth more in detail.

The upper end of piston extension 9 carries a gas baffle 11 and has a substantially cone-shaped top 12 to prevent lodgment thereon of sealing liquid.

The cylinder, which may be of cast metal, is preferably so constructed as to separate along the line 13—13, thereby giving easy access to the valves and their seats and yet introducing no cylinder joint over which the packing rings of the piston must travel. It can, however, be made in several parts separable at other levels, provided none of the joints is low enough to be encountered by that part of the piston which is relied on to seal the cylinder.

The exhaust conduit 14 communicates with an exhaust port 15 preferably through a small exhaust pocket 16; and controlling the passage of gas from the cylinder to the exhaust conduit is a suitable valve, here shown as a puppet valve 17 housed within exhaust pocket 16 and provided with a valve stem 18 passing through the wall of conduit 14 and guided thereby. Exhaust port 15 and its adjacent pocket 16 are at such a level that when the piston is at the upper limit of its stroke this pocket is filled with sealing liquid and valve 17 need not, therefore, fit on its seat with the exactness that would be required if it were exposed directly to the compressed or expanding gasses of the cylinder.

Figure 4:
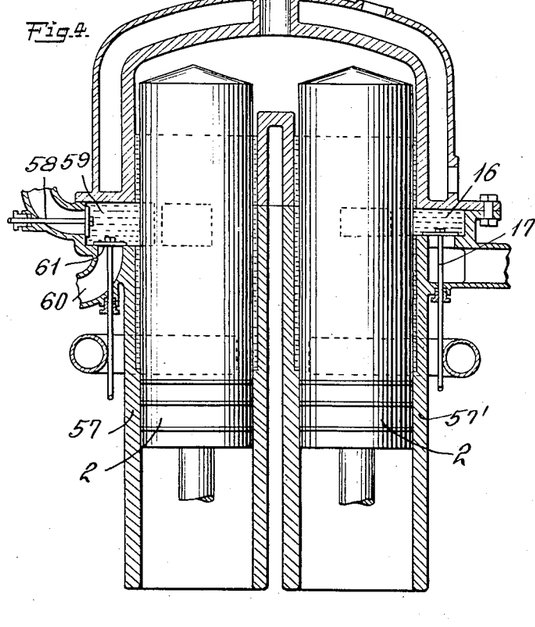
Fig. 4 illustrates a double cylinder type embodying certain features of the present invention.

I do not regard my invention as limited to the use of but a single exhaust valve, for more than one may be used as indicated in the modification of Fig. 4, or when occasion may require.

The cylinder is also provided with an intake conduit 19 which leads to an intake port 20, preferably provided with an intake pocket 21. A fuel intake valve 22 serves to control the flow of combustible mixture to the cylinder, and may be in the form of a puppet valve, as shown, having its stem 23 passing through and supported by the wall of the intake conduit. Intake pocket 21, like exhaust pocket 16, is at such a level as to be flooded with the sealing fluid when the piston is at the upper end of its stroke, and by making the seat for fuel intake valve 22 slightly higher than the seat of exhaust valve 17, the water above valve 22 can be drawn off completely by overflowing at the other valve seat. While it is intended that there shall be no flow of water from pocket 21 into intake conduit 19, still provision is made for leakage around the valve during the working stroke of the piston by making the intake conduit 19 in the form of a trap with an outlet at the bottom into a pipe 24 wherein an appropriate water level is maintained by a hydrostatic head adequate to resist the air pressure normally existing within this conduit.

Near the outer end of intake conduit 19 is an air supply pipe 25 which communicates therewith through an air supply valve 26. Between this valve and the cylinder is a fuel supply valve 27 governing the flow into intake conduit 19 of the mixture of air and pulverized solid fuel conveyed thereto through a pipe 28.

Figures 5, 6, 7, 8:
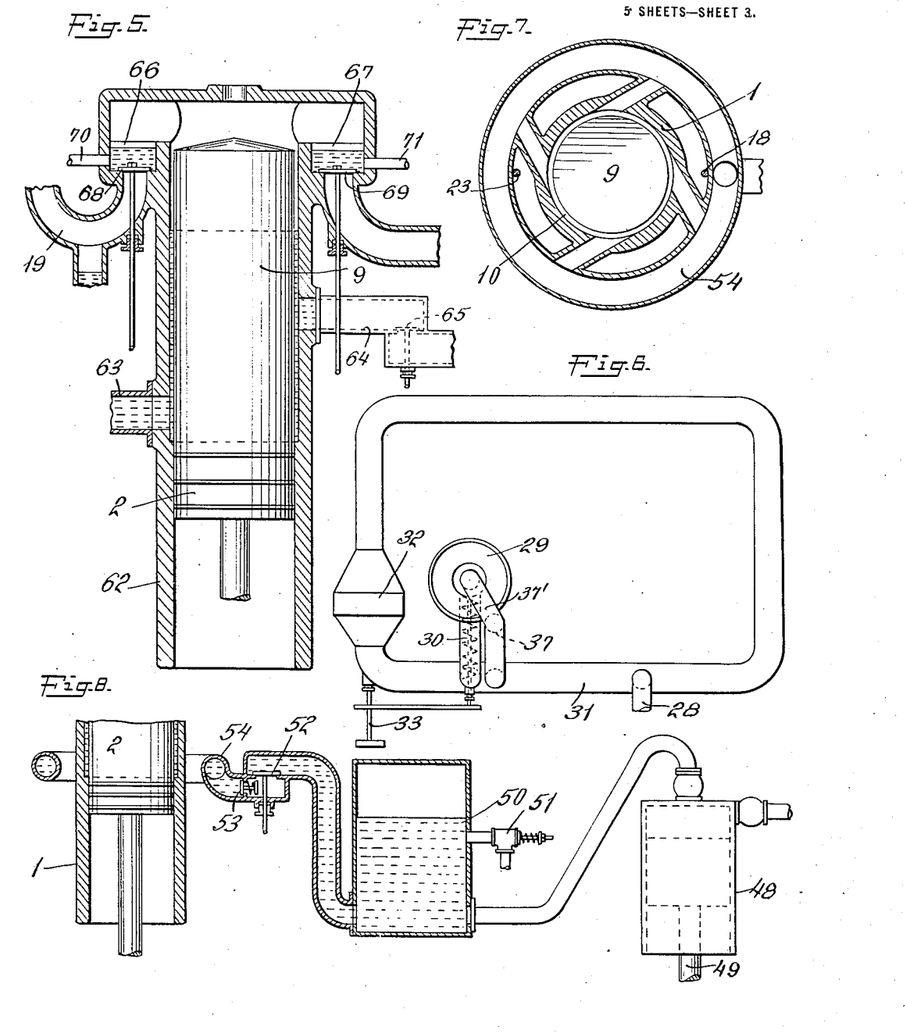

For a better understanding of the apparatus wherein the combustible mixture is formed, reference may be had to Fig. 6, which shows somewhat diagrammatically the various elements of the system. In this embodiment, the pulverized fuel is deposited in a hopper 29 from which it is moved in measured quantity by a screw conveyer 30 and delivered thereby into a moving column of air circulating through a conduit 31 which is closed on itself and provided with a blast fan 32 driven as by a shaft 33. By positioning the screw conveyer as shown, the powerful blast of air takes up the powdered fuel as it is dropped into the conduit from the screw conveyer and carries it forward into the fan, where a more intimate mingling of fuel and air is produced. By properly proportioning the diameter and length of the conduit, the speed of the fan and the volume of materials treated, there may be produced within the conduit a constantly circulating stream of combustible mixture wherein the fuel dust will substantially all be held in suspension ready for delivery to the engine through pipe 28, when needed.

As a means for replenishing in conduit 31 the air drawn off and delivered to the engine, there is provided an air pump 34 (Fig. 1) driven in suitable manner, as from a crank 35 on engine shaft 8, this pump storing air under suitable pressure, say 2 to 5 pounds per square inch, in an air reservoir 36, from which it is delivered through a pipe 37 to conduit 31 of the mixture-forming system of Fig. 6. A branch pipe 37' leads from pipe 37 to the top of the hopper 29 to cause air pressure to be exerted upon the pulverized fuel therein, thus tending to aid the discharge of fuel from the hopper. By suitably throttling the air intakes 38 of pump 34 the quantity of air delivered to the system may be adequately controlled.

The mechanism for operating and suitably timing exhaust valves 17, fuel intake valve 22, fuel supply valve 27 and air supply valve 26 may vary in detail, but are here illustrated as comprising a bevel gear 39 secured to engine shaft 8 and meshing with a gear on shaft 40, the upper end of which is suitably connected through bevel gearing 41 with a horizontal cam shaft 42 whereon is mounted a cam 43 operative on the roller of a cam lever 44 of usual construction, one end of which engages the stem 18 of the exhaust valve 17 and by transmitting action of the cam effects and times the opening of that valve.

Cam shaft 42 likewise carries a cam 45 for controlling the movements of the fuel intake valve 22, and similar cams 46 and 47 for actuating and timing the opening of valves 27 and 26, respectively.

The apparatus for intermittently supplying liquid to renew the seal about the piston extension and over the fuel intake and exhaust valves is indicated diagrammatically in Fig. 8 as comprising a pump 48 suitably driven by a connecting rod 49 connected with crank 35 of engine shaft 8. This pump takes water from a main or other source of supply and delivers it into an air trap tank 50 wherein the pressure is limited by a relief valve 51 communicating with the tank below the normal level of the liquid therein. From this pressure tank 50 the liquid passes by a puppet valve 52 and through a check valve 53 and is delivered to a manifold 54 from which one or more pipes lead tangentially through the wall of cylinder 1 to deliver the water with a rotary motion into the gap between piston extension 9 and the wall of the cylinder. The rotary and rising movement of the water in this space serves to scour the walls and serves to lift and transport any sediment, ash, carbon deposit or the like, which might otherwise tend to collect in this gap and ultimately work down into contact with the piston rings and the coöperating smooth face of cylinder 1. The introduction of water under pressure from the air trap tank 50 to the cylinder is controlled and timed by puppet valve 52, the stem of which is actuated by a cam 55 on cam shaft 42. Instead of using a puppet valve for controlling the supply of water any other appropriate form, as for instance a rotating valve driven from cam shaft 42, may be used.

With a combustible mixture of air and pulverized solid fuel, such as coal dust, circulating through the conduit 31 of Fig. 6, and the engine piston and valves in the position shown in Fig. 1, with the liquid seal filling the exhaust pocket 16 and intake pocket 21, and filling the gap between piston extension 9 and the cylinder wall to about the level indicated, the cycle of operation is substantially as follows:

Because of the expansion of the charge in the cylinder, (this expansion having been induced by spark plug ignition, hot tube ignition, or equivalent ignition,) and although considerable pressure is thereby applied to the body of liquid 10, no considerable leakage takes place either past the piston rings 3 or under the puppet valves 17 and 22. As the piston moves downward and turns engine shaft 8, the resultant rotation of cam shaft 42 and its cams opens exhaust valve 17 and allows escape of the sealing liquid down to the level of the valve seat, this escape being rapid because of the pressure of expanding gases at the top of the cylinder and serving to completely uncover fuel intake valve 22 before that valve opens. The water thus escaping past exhaust valve 17 passes off through exhaust conduit 14 ahead of or with the exhaust gases and its cooling action on the muffler and associated parts is advantageous.

As soon as the pressure in the cylinder has been relieved through escape of the exhaust gases past exhaust valve 17, the fuel intake valve 22 is cammed open to establish communication between intake conduit 19 and the cylinder. Conduit 19 is at this stage filled with air and relatively free from suspended or deposited fuel dust. The fuel supply valve 27 is cammed open and a combustible mixture of pulverized solid fuel, such as coal dust and air, is admitted into intake conduit 19, and passes forward under the impelling action of the pressure in the fuel circuit of Fig. 6, being preceded, however, in its entrance into the cylinder, by the pure air previously trapped in conduit 19. By thus introducing a body of air into the cylinder in advance of the fuel charge, direct contact is prevented between the entering fuel and such residual gases as may remain in the cylinder from the preceding explosion. This preliminary air blast has the further function of sweeping residual moisture from around fuel intake valve 22 and out of its intake pocket 21, so that the incoming dry dust will not become wet and perchance caked on the surface of these parts, but will pass freely into the cylinder against baffle 11 and thereby be properly distributed ready for compression on the return or up-strike of the piston. Under such conditions it is possible to leave exhaust valve 17 open for a time longer than would be permissible if air did not enter the cylinder in advance of the fuel charge, and by leaving it open long enough, the incoming air will thoroughly scavenge the cylinder. Even though some of the air may follow through behind the exhaust gases and escape past exhaust valve 17, there need be no loss of fuel through such leakage.

While fuel intake valve 22 is still open, fuel supply valve 27 closes and air supply valve 26 opens, and the air blast thus admitted follows through behind the fuel charge and sweeps out the charge and any dust that might otherwise collect in intake conduit 19. After the dust laden charge has gone past fuel intake valve 22, that valve and air supply valve 26 are closed. This leaves intake conduit 19 filled with pure air ready for the next cycle. The movements of valves 22 and 26 and 27 are timed by their respective cams and are open for periods appropriate to whatever amount of combustible charge is desired within the cylinder.

With the charge in the cylinder ready to be compressed and valves 17, 22, 26 and 27 all in closed position, the piston may have started on its upward movement, and at this stage valve 52 is cammed open and the sealing liquid, such as water, under appropriate pressure from tank 50, is admitted past check valve 53, and rises with a rotary movement within the cylinder about the piston extension 9, ultimately flooding pockets 16 and 21 to thereby seal their valves, and rising thereabove to the desired level, the piston then continuing its upward movement to complete the compression of the charge and render it ready for ignition. This completes the cycle of operation.

In addition to its function as a seal for the piston and the valves, the liquid body 10 cools these parts and the cylinder and washes them free from ash and slag and flushes these foreign materials from the cylinder promptly.

In the modification illustrated in Fig. 2, the cylinder 1 is of uniform bore throughout and the piston extension 9' is of smaller diameter than piston 2, thereby providing an annular space into which the sealing liquid 10 may be received and wherein it acts, as described in connection with Fig. 1. In Fig. 1 the liquid seal may be regarded as a stuffing box through which the piston extension moves, whereas in Fig. 2, the sealing fluid is more like a piston packing movable up and down with the piston. With this construction the inertia of the water is altogether overcome by the pressure of the combustible mixture of gases at the top of the cylinder, it being understood that there is a relatively definite relation between engine speed, gas pressure and inertia of the sealing liquid, and consequently that the speed must not be great enough to bring the inertia of the liquid above the restraining effect of the gases.

Figure 2:
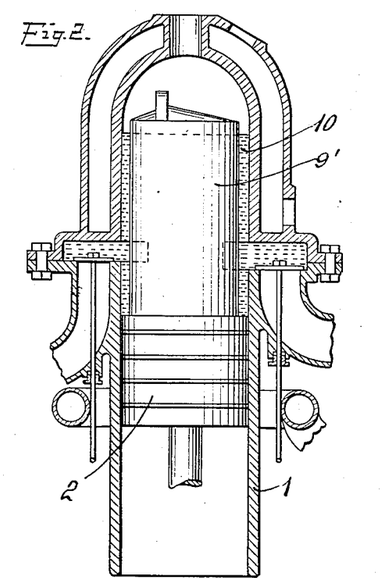
Fig. 2 is a sectional elevation of a modified form of cylinder.
Figure 3:
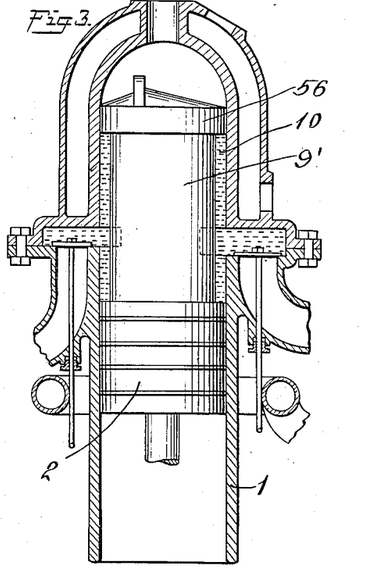
Fig. 3 is a sectional elevation of a further modification.

In the modification illustrated in Fig. 3, the cylinder 1 is of uniform bore and the extension 9' of piston 2 is of smaller diameter, as in Fig. 2, and to restrain the inertia effect of the moving liquid, there is provided on the inner end of extension 9' an enlargement 56 fitted to the engine cylinder with a small but appreciable clearance. This clearance is large enough to admit full gas pressure to the liquid seal but small enough to keep the main body of sealing liquid within the annular space below enlargement 56. The adjuncts for use with the cylinders of Figs. 2 and 3 are preferably the same in all respects as those described in connection with the cylinder of Fig. 1, and the mode of operation is likewise the same.

In the Toussaint type of engine illustrated in Fig. 4 there are two cylinders 57 and 57' communicating at their upper ends and each provided with a piston 2 of substantially the construction described in connection with Fig. 1. Cylinder 57' is provided with an exhaust valve 17 housed in an exhaust pocket 16, but preferably a plurality of such valves and pockets are grouped about this cylinder, as indicated in dotted lines in Fig. 4. The other cylinder 57 is provided with an intake valve 58, preferably in duplicate or in triplicate, as indicated in dotted lines, and movable horizontally within a pocket 59. At the bottom of this pocket is a water egress 60 controlled by a puppet valve 61, and through this egress, on opening of valve 61, the water or other liquid from pocket 59 can be drawn off to uncover the intake valve and prepare for the entrance of the combustible mixture into cylinder 57. With this modification, therefore, the sealing liquid can escape not only into the exhaust conduit past valve 17, but also through a separate egress nearer to the intake valve, and as water inlets are distributed about cylinders 57 and 57', much as in the case of cylinder 1 of Fig. 2, an upward and prompt circulation of the liquid about the piston extensions and its prompt discharge and resultant efficient flushing off of ash is insured.

The mode of operation for this modification is essentially the same as that for the type shown in Fig. 1, and its valve operating cams and other adjuncts are the same, except for such small variations as result from the use of the greater number of valves, the horizontal positioning of the intake valves, and the presence of additional valves near the intakes.

The modification illustrated in Fig. 5 is for a four-cycle engine. The cylinder 62 has an enlarged diameter about piston 2, as in Fig. 1, but the arrangement of valves and of fluid inlets and outlets is somewhat different. Preferably water under suitable pressure, as from a pumping and storing system, such as is shown in Fig. 8, is admitted at suitable time intervals through an inlet 63, and circulates with a rotary motion upward through the annular space between the piston extension 9 and the cylinder wall, finally finding exit through an outlet pipe 64, the exit through which is controlled by a cam-actuated puppet valve 65 indicated diagrammatically in Fig. 5 but operating much like valve 17 of Fig. 1.

The upper end of cylinder 62 here shown as a T-head has pockets 66 and 67 wherein are housed, respectively, the fuel intake valve 68 and the exhaust valve 69. Valve 68 can be covered with a sealing liquid, such as water, admitted through pipe 70 under pressure as from the system of Fig. 8, and similarly the liquid can be admitted through pipe 71 to cover exhaust valve 69. The valves 68 and 69 are preferably cam-actuated at suitable time intervals to cause the engine to operate as a four-cycle engine, and the intake conduit 19 and its fuel supply system are essentially the same as described in connection with Fig. 1, excepting that the scavenger pump and its air reservoir may be omitted and the system for circulating solid fuel, for instance pulverized coal, may be at atmospheric pressure and deliver the charge to the cylinder at that pressure on the charging stroke of the piston, as in ordinary four-cycle practice.

Fig. 5 shows the four-cycle cylinder at the explosion stage and with all valves closed, and all points sealed with the liquid, say water. When the explosion occurs and the gases expand, the piston moves downward, but before it reaches its lower limit, exhaust valve 69 is lifted and its water seal expelled by the expanding gases of the cylinder. On the return stroke, with the exhaust valve 69 open, the products of combustion are expelled past that valve and at about the time the upward movement is completed, or shortly before, intake valve 68 is cammed upward to permit its water seal to drain off through conduit 19 and prepare the intake for the admission of the fuel charge on the next downward or charging stroke of the piston. This charging stroke is accompanied by closure of exhaust valve 69, as in ordinary practice. On completion of the charging stroke, intake valve 68 is permitted to close and water is immediately admitted over this valve and over exhaust valve 69 to seal those valves on the upward or compression stroke.

The transit of water or other liquid through intake 63 and outlet pipe 64 is likewise timed by valve 65 to correspond with the movements of the piston, this body of water being renewed each cycle at a time when there is no substantial gas pressure on it.

With this four-cycle type, as with the type of Fig. 1, the water or other liquid keeps the parts cooled, flushes off the ashes if, as preferred, a solid fuel is used, washes sediment from beneath the intake and outlet valves, and makes possible continuous operation on pulverized solid fuel in a cylinder which, except for this protection, would quickly become scored and cut and otherwise rendered unsatisfactory if not indeed inoperative.

Figure 9:
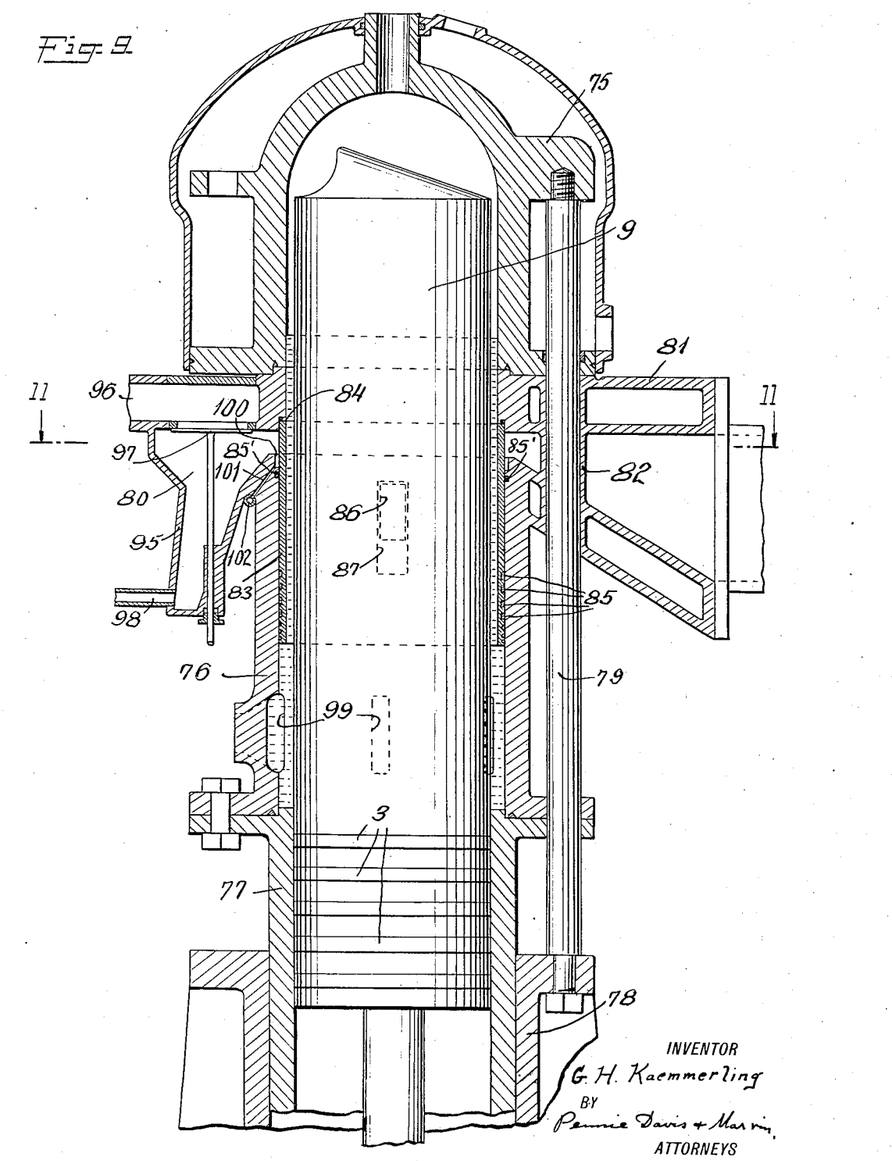
Fig. 9 is a sectional elevation of a modified form of cylinder having a sleeve valve.
Figure 10:
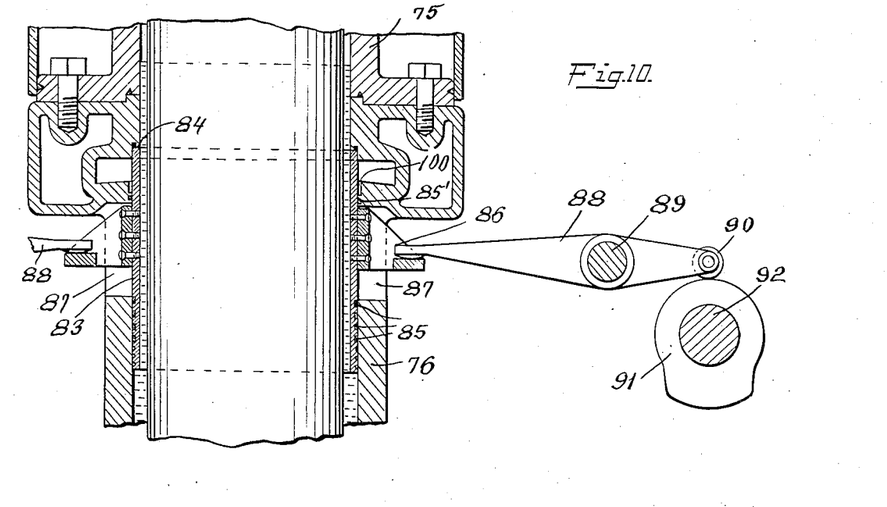
Fig. 10 is a sectional elevation at right angles to the section plane of Fig. 9.
Figure 11:
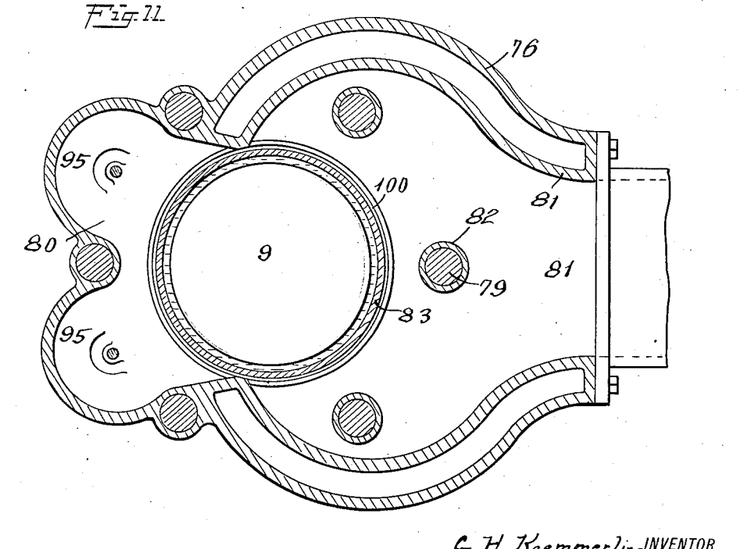
Fig. 11 is a cross-section along the line 11—11 of Fig. 9.

Figs. 9, 10 and 11 show a modification of the invention in which a sliding valve for controlling the water ports is substituted for the puppet valves of the other figures. In this case the cylinder is made of three engaging sections 75, 76 and 77 which are retained in place upon a standard or base 78 by bolts 79. The bore of section 77 is slightly less than that of the remaining sections in order that there may be an annular liquid chamber surrounding the piston 9. The bottom of the piston which is provided with packing rings 3 fits closely within the bore of section 77. The intermediate section 76 is provided with lateral extensions 80 and 81 forming chambers through which fuel and liquid may be supplied. By constructing these chambers as shown the ports communicating with the annular chamber about the piston may extend around substantially the entire circumference thereof. The portions of the section 76 on either side of the ports are held apart by the connecting members 82 through which the bolts 79 pass.

Since the ports extend throughout substantially the entire circumference of the section 76 a convenient way of controlling them is by means of a sleeve valve 83 fitted within the bore of section 76 and engaging a shoulder 84 provided with a packing ring near the upper end of this bore. This sleeve valve is provided with packing rings 85 and additional rings may be inserted in the inner bore of section 76 as at 85'.

This valve is actuated by means of the mechanism shown most clearly in Fig. 10. Arms 86 attached to opposite points of the sleeve project through slots 87 in section 76 and are engaged by levers 88 pivoted at 89 and carrying rollers 90 at their outer ends which contact with cams 91 on shafts 92 driven in timed relation with the main shaft of the engine. Springs arranged in any convenient manner may be used for closing the sleeve valve against shoulder 84.

The extension 80 is formed with two wells 95 and has a passage 96 communicating with the fuel supply. Between the passage 96 and each well 95 are puppet valves 97 the stems of which extend through bearings in the inner walls of the wells. Each valve may be held closed by a light spring. Each well is provided, at or near its bottom, with an orifice 98 of regulated size to allow gradual escape of the water which may be discharged into the wells from the intake ports of section 76. The size of the orifices may be controlled by valves and they should be so small that the incoming charge will not escape through them.

The ports through which fresh water is injected are shown at 99. To prevent any deposit of ash from above a small groove 100 immediately above the packing ring 85' is provided. This groove is flushed periodically and may be drained through an orifice 101 communicating with a pipe 102.

This modification of the invention has substantially the same mode of operation as the other embodiments hereinbefore described, but the supply of fuel to the combustion chamber of the cylinder, the exhaust of the products of combustion and the drainage of the water surrounding the piston are controlled by the sleeve valve 83, the actuating mechanism of which may be driven from the engine shaft after the manner of shaft 42 of Fig. 1. So also with this modification of the invention the liquid may be supplied through the ports 99 by means of the apparatus shown in Fig. 8.

I am aware that many details of the various modifications above described may be changed, and I desire to include as my invention such variations of the constructions herein particularly described as reasonably come within the terms of the appended claims.

I claim:

1. An internal combustion engine comprising in combination, a cylinder, a piston within said cylinder, a liquid packing about said piston, and means permitting the discharge of the liquid packing after each period of combustion within the cylinder.

2. An internal combustion engine comprising in combination, a cylinder, a piston within said cylinder, a liquid packing about said piston, means permitting the discharge of the liquid packing after each period of combustion within the cylinder, and means for periodically renewing said packing.

3. An internal combustion engine comprising in combination, a cylinder, a piston within said cylinder, means for supplying fuel periodically to said cylinder, a liquid packing around said piston, means permitting the discharge of the liquid packing after each period of combustion within the cylinder, and means for renewing said packing after each combustion of fuel within said cylinder.

4. An internal combustion engine comprising, in combination, a cylinder, a piston within the cylinder, ports communicating with said cylinder, valves for said ports, means for supplying liquid for said cylinder to cover said valves while combustion is occurring within the cylinder, and means permitting the discharge of the liquid after combustion has occurred.

5. An internal combustion engine comprising, in combination, a cylinder, a piston within the cylinder, ports communicating with said cylinder, valves for said ports, means for supplying water for said cylinder to cover said valves while combustion is occurring within the cylinder, and means permitting the discharge of the water after combustion has occurred.

6. An internal combustion engine comprising, in combination, a cylinder, a piston within the cylinder, fuel supply ports communicating with said cylinder, valves for said ports, means for supplying liquid to said cylinder to cover said valves after a fuel charge has been supplied to the cylinder, and means permitting the discharge of the liquid from said cylinder after combustion has occurred therein.

7. An internal combustion engine comprising in combination, a cylinder, a piston within the cylinder, fuel supply ports communicating with said cylinder, valves for said ports, means for supplying a liquid packing to said cylinder after a fuel charge has been supplied to the cylinder, and means whereby the pressure of the products of combustion thereafter causes the discharge of the liquid packing from said cylinder.

8. An internal combustion engine comprising in combination, a cylinder, a piston within the cylinder, valves for controlling the supply of fuel to said cylinder, means for supplying a liquid packing to said cylinder, means permitting the discharge of the liquid packing after combustion has occurred in said cylinder, and means under the control of the engine for actuating said valves and said supplying and discharging means in timed relation.

9. An internal combustion engine comprising in combination, a cylinder, a piston within the cylinder, a valve for controlling the supply of fuel to said cylinder, a second valve for supplying liquid packing to said cylinder to cover said fuel valve when said piston is in compression position, and a third valve permitting the discharge of the liquid packing and the products of combustion after combustion has occurred.

10. An internal combustion engine comprising in combination, a cylinder, a piston within the cylinder, a valve for controlling the supply of fuel to said cylinder, a second valve for supplying liquid-packing to said cylinder to cover said fuel valve when said piston is in compression position, a third valve permitting the discharge of the liquid packing and the products of combustion after combustion has occurred, and means for operating all of said valves in timed relation.

11. An internal combustion engine comprising in combination a cylinder, a piston adapted to reciprocate within said cylinder, a chamber between a portion of said cylinder and a portion of said piston, means for supplying fuel to said cylinder, means for thereafter supplying liquid packing to said chamber, and means for draining the liquid packing from said chamber and exhausting the products of combustion from said cylinder after combustion has occurred.

12. An internal combustion engine comprising in combination a cylinder, a piston within said cylinder, means for supplying an explosive mixture of pulverized fuel and air to said cylinder intermittently, means for igniting the mixture within the cylinder, a liquid packing surrounding the piston, and means for draining the packing after each explosion to remove the residue of combustion therewith.

13. In an internal combustion engine, a source of pulverized fuel supply for said engine, means for mixing air with the fuel, a cylinder, a valve for supplying the fuel mixture to the cylinder intermittently, means for supplying liquid packing to the cylinder, means for igniting the fuel mixture, and means for draining off the packing to flush the valve and remove the solid residue of combustion after each ignition.

14. In an internal combustion engine, a source of pulverized fuel supply for said engine, means for mixing air with the fuel, a cylinder, a valve for supplying the mixture of fuel and air to said cylinder intermittently, a piston within said cylinder, means for supplying a liquid packing for said piston prior to each combustion within the cylinder, and means for draining said liquid packing after each combustion whereby the solid residue resulting therefrom is removed.

15. The method of operating an internal combustion engine which comprises admitting air to clear out a fouled combustion chamber, admitting a fuel charge to the combustion chamber through the intake conduit, flushing out the intake conduit with air, compressing and igniting the fuel charge, removing the products of combustion through an exhaust conduit and flushing out the exhaust conduit by a liquid.

16. The method of operating an internal combustion engine which comprises admitting air to clear out any products of combustion remaining in the combustion chamber, admitting a fuel charge to the combustion chamber through the intake conduit, flushing out the intake conduit with air, supplying liquid to said combustion chamber to seal the piston and valves thereof, compressing and igniting the fuel charge, removing the products of combustion through an exhaust conduit and flushing the valves and exhaust conduit by an outflow of the sealing liquid.

17. The method of operating an internal combustion engine which comprises admitting air to clear out any products of combustion remaining in the combustion chamber, admitting a charge of air and pulverized solid fuel to the combustion chamber through an intake conduit and valve, admitting air to said intake conduit to sweep out any solid fuel remaining therein, supplying liquid to said combustion chamber to seal the piston and valves thereof, compressing and igniting the charge in said combustion chamber, removing solid residue of combustion and flushing the piston and valves by discharging the liquid through the exhaust conduit and thereafter removing gaseous products of combustion through the exhaust conduit.

18. The method of operating internal combustion engines which comprises periodically supplying a liquid to seal the piston and cover the valves of the combustion chamber, compressing and igniting a fuel charge in said combustion chamber and thereafter removing the liquid to flush the valves and exhaust passages while the products of combustion are being removed therethrough.

19. The method of sealing and cooling the valves of an internal combustion engine which comprises flooding the valves with a liquid prior to each explosion of fuel within the cylinder of the engine, removing the liquid above the valves after each explosion and replenishing the supply of liquid before the next explosion.

20. The method of sealing and cooling the valves of an internal combustion engine which comprises flooding the valves with a liquid prior to each explosion of fuel within the cylinder of the engine and ejecting, after each explosion, the liquid above the valves by means of the gases resulting from the explosion whereby the valves and exhaust passages are flushed after each explosion.

21. An internal combustion engine comprising in combination, a cylinder, a piston within the cylinder, a port communicating with the cylinder, a sleeve-valve for controlling said port, means for supplying liquid packing to said cylinder periodically and means for operating said sleeve-valve in timed relation to said liquid supplying means to control the supply of fuel to said cylinder and the removal of liquid packing therefrom through said port.

22. An internal combustion engine comprising, in combination, a cylinder, a piston within the cylinder, chambers communicating with said cylinder through ports in the sides thereof, a valve slidably mounted within said cylinder for controlling said ports, a fuel-supply conduit, a valve for controlling communication between said conduit and one of said chambers, means for supplying a liquid packing to said cylinder periodically, and means for actuating said valves and said supplying means in timed relation whereby fuel is supplied to said cylinder through one of said ports and liquid packing and products of combustion are discharged thereafter through said ports.

23. An internal combustion engine comprising, in combination, a cylinder, a piston within the cylinder, ports communicating with said cylinder, valves for said ports, means for supplying a liquid to said cylinder to cover said valves while combustion is occurring within the cylinder, and means permitting the discharge of the liquid after combustion has occurred.

In testimony whereof I affix my signature.

GUSTAV H. KAEMMERLING.